United States Patent [19]
Ryanen

[11] 3,881,790
[45] May 6, 1975

[54] ONE PIECE MOLDED PLASTIC RETAINER FOR CYLINDRICAL ROLLER BEARINGS AND METHOD OF MANUFACTURE

[75] Inventor: Robert M. Ryanen, Commerce Township, Oakland County, Mich.

[73] Assignee: Federal-Mogul Corporation, Southfield, Mich.

[22] Filed: Aug. 6, 1973

[21] Appl. No.: 385,859

[52] U.S. Cl. ............................................. 308/217
[51] Int. Cl. ............................................. F16c 33/49
[58] Field of Search ................................... 308/217

[56] References Cited
FOREIGN PATENTS OR APPLICATIONS
1,194,422   5/1959   France............................. 308/217

*Primary Examiner*—M. Henson Wood, Jr.
*Assistant Examiner*—Richard A. Bertsch
*Attorney, Agent, or Firm*—Harness, Dickey & Pierce

[57] ABSTRACT

A one-piece molded plastic retainer for a roller bearing assembly, which retainer defines a plurality of pockets for the rollers wherein alternately disposed upper and lower side rails support a plurality of cross bars and define the pockets of the retainer, and; a new method of manufacturing such retainers.

10 Claims, 5 Drawing Figures

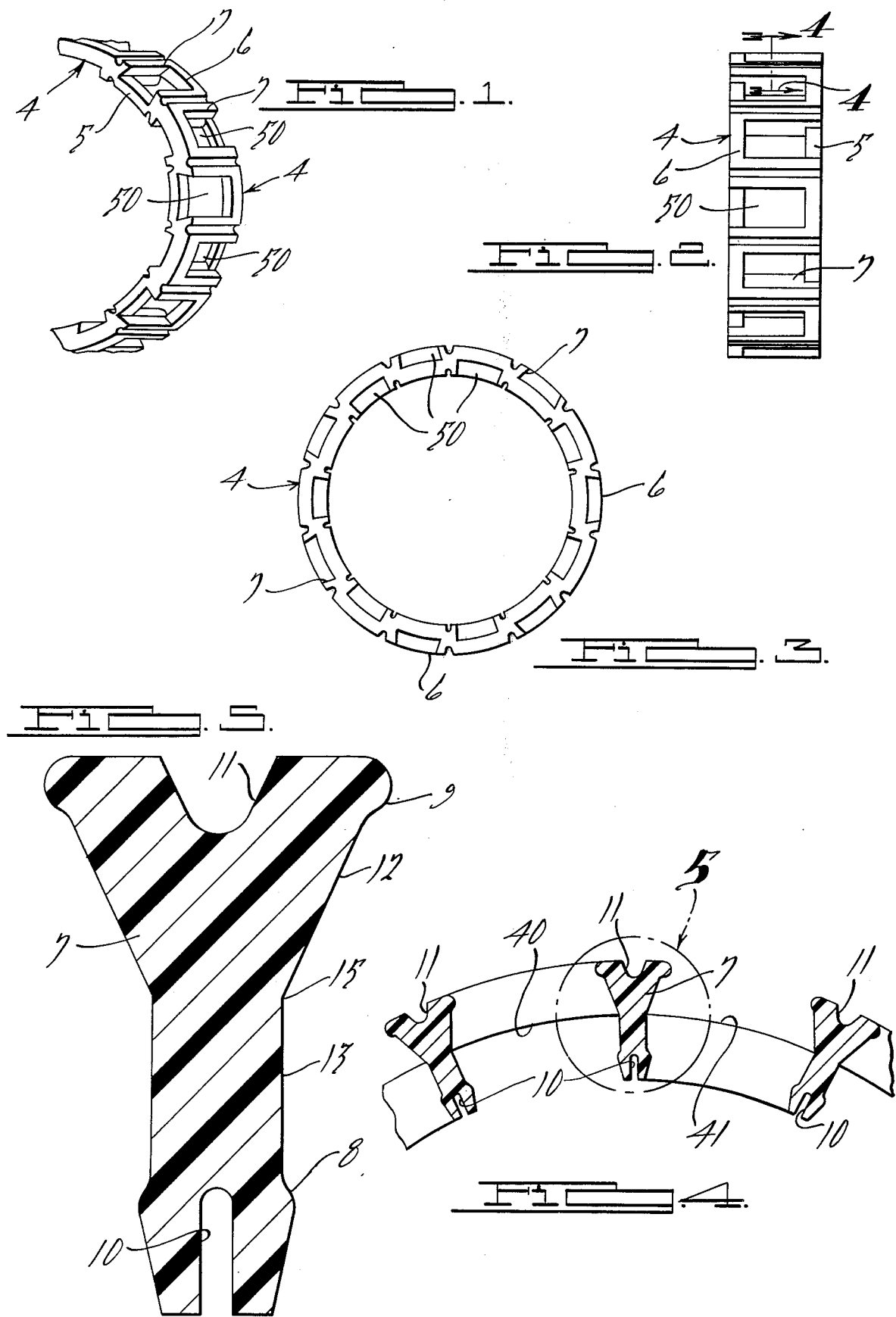

ONE PIECE MOLDED PLASTIC RETAINER FOR CYLINDRICAL ROLLER BEARINGS AND METHOD OF MANUFACTURE

BACKGROUND OF THE INVENTION

The invention broadly relates to a new and specially constructed one-piece molded plastic retainer or cage member for roller bearing assemblies. The invention also relates to a novel method of manufacturing the retainer construction discovered and disclosed herein.

The state of the art is indicated by the following U.S. Pat. Nos.: Aho, 3,102,760; Kohler, et al. 3,051,534; Brodin, 2,044,663; Lovell, et al. 2,657,106; Schaeffler, et al. 2,722,128; Gothberg, et al. 3,057,677; Bratt, 3,075,278; Biedinger, 3,141,711; Schmidt, 3,163,477; Altson, 3,172,710; Altson, 3,206,263; Mayer, et al. 3,212,834; Oechsler, 3,350,149; Steinert, 3,353,881.

Prior plastic retainer constructions such as in Aho, U.S. Pat. No. 3,102,760, while being highly useful for numerous applications, have presented certain difficulties. For example, the retainer of the Aho patent has been found to be of insufficiently strong construction and it is not rigid, rather it is overly flexible in the direction of the retainer axis; moreover, the Aho retainer pockets are not well defined such as to fully enclose the rollers.

A main object of the present invention is to provide a new one-piece molded plastic retainer for cylindrical roller bearing assemblies.

Another object of the present invention is to provide a novel method of manufacturing a one-piece molded plastic retainer.

Another object of the present invention is to provide a new retainer construction for bearing assemblies wherein the retainer is of balanced construction, is rigid, and wherein each pocket defined within the retainer is generally fully enclosed.

Another object of the present invention is to provide a new retainer construction wherein the cross-bar thereof possesses a cross-sectional shape which facilitates insertion of the rollers and which includes relief portions to provide a predetermined desired flexibility to the cross-bar.

SUMMARY OF THE INVENTION

The new retainer construction and method of manufacture discovered and disclosed herein involve a unique structure for the retainer or cage which allows it to be molded (e.g. by injection molding) in one-piece by reciprocating mold die halves. This retainer includes alternately disposed upper and lower side rails together with a special cross-bar member; and, the retainer is of balanced, generally rigid construction with each pocket thereof being esentially fully enclosed.

Other objects, features and advantages of the present invention will become apparent from the subsequent description and the appended claims taken in conjunction with the accompanying drawings.

BRIEF DESCRIPTION OF THE DRAWINGS

FIG. 1 illustrates a preferred form of the new retainer in accordance with this invention;

FIG. 2 illustrates an end view of the retainer of FIG. 1 from outside the retainer looking along a radial dimension line thereof;

FIG. 3 illustrates a left-end view of FIG. 2;

FIG. 4 illustrates a partial sectional view taken along the line of 4—4 of FIG. 2; and FIG. 5 is an enlarged view of the area designated by the numeral "5" in FIG. 4.

DESCRIPTION OF PREFERRED EMBODIMENTS

Looking now to the drawing FIGS. 1–5, there is illustrated a preferred embodiment of the retainer designated 1 for use in a roller bearing assembly. The retainer side rails designated 4 are comprised of a bottom or lower side rail portion 5 and a top or upper side rail portion 6. The retainer side rails 4 are connected by cross bars 7. It is to be noted from the cross sectional view of FIG. 4 that the lower most edge 40 of portion 6 corresponds in diametric dimension with the uppermost edge 41 of portion 5. This allows the die mold halves to move in from the axial direction of the retainer to form the complete mold cavity, thus permitting the one-piece molded plastic retainer 1 in accordance with this invention to be molded as a single piece. Upon withdrawal of the mold die halves the result is the one-piece molded plastic retainer 1. Furthermore, this results in a retainer which is of balanced construction, is rigid, and wherein each pocket of the retainer is essentially fully enclosed.

The retainer 1 is balanced in that it is to be noted that there are as many lower side rail portions 5 as upper side rail portions 6. Also, it should be understood that the amount of plastic material in the lower side rail portion 5 may be the same as in the upper side rail portion 6. In order to have the same amount of plastic material in the lower portion 5 as in the upper portion 6, this requires for a slightly greater radial thickness in the portion 5 in order to acquire the same amount of plastic material as in the upper portion 6 which is of slightly increased circumferential dimension.

It should also be understood that the amount of plastic material in lower side rail portion 5 may be structured such that it is of slightly less quantity than the upper side rail portion 6 in order to provide dynamic balance to the retainer, that is, in order to compensate for centrifugal force.

Each pocket 50 of the retainer 1 is encompassed, or defined, by the two lower and upper side rail portions 5 and 6 respectively, and two cross-bars 7—7. This type of pocket construction 50 leads to a substantial difference over prior retainers in that the retainer construction of this invention is of relatively rigid and balanced construction due to the formation of the lower and upper side rail portions 5 and 6 which support the cross-bar 7.

It has also been discovered as a part of the invention herein that the cross sectional shape of the cross bar 7 is of particular importance. The bar side walls 12 and 13 (FIG. 5) are designed to intersect at a point of intersection 15 which is also the parting line of the molding dies. When the rollers are assembled in place within the retainer, this point of intersection is out of contact, and in effect recessed, away from the rollers such that the flash, if any, along this line of intersection resulting from the molding process will not touch or contact the rollers at any time. The retainer or cage as disclosed herein can be used for (1) general type roller assembly, (2) inner race assemblies, and (3) outer race assemblies. The rollers can be inserted from the radially outward or radially inward direction. The rollers are maintained within the retainer or cage 1 by nibs 8 or 9 as the case may be. Each nib member 8 or 9 can be satisfactorily held in close tolerance and each has a certain degree of flexibility built into it structurally due to the cross-sectional shape of the cross bar 7 itself which possesses the relief portions designated 10 and 11 respectively.

The new method of manufacturing the retainer 1 is as follows – two mold halves are provided with mold dies shaped to form the desired retainer 1 and, the mold dies are of the type which close in axially from each side of the retainer 1. With the two mold halves closed the plastic material is injected or forced into the mold cavity by a screw means under pressure. The plastic which is injected is in a fluid or heated condition and after the plastic is injected into the mold cavity the mold is cooled to set up the plastic until the plastic is dimensionally stable. The mold halves are subsequently withdrawn along the axial line of the retainer 1 and with the mold thus opened ejector pins are used to eject the retainer 1 from the mold.

While it will be apparent that the preferred embodiments of the invention disclosed are well calculated to fulfill the objects above stated, it will be appreciated that the invention is susceptible to modification, variation and change without departing from the proper scope or fair meaning of the subjoined acclaims.

What is claimed is:

1. In a bearing assembly including a plurality of rollers retained in circumferentially-spaced relationship, the improvement comprising a one-piece molded plastic retainer defining a plurality of pockets within which the rollers are disposed, said retainer comprising a pair of spaced circular side rails interconnected at circumferentially-spaced intervals by axially extending cross bars, each side rail comprised of a plurality of alternating arcuately-shaped upper side rail sections and lower side rail sections, each side rail section extending circumferentially between two adjacent cross bars and integrally connected thereto, said upper and said lower side rail sections disposed in alternating sequence circumferentially around each side rail and said upper side rail sections of one side rail disposed axially opposite to a lower side rail section of the other said side rail and vice versa.

2. The bearing assembly as defined in claim 1, in which the radius of the radial inner edge of said upper side rail section is at least equal to the radius of the radial outer edge of the axially disposed adjacent said inner side rail section.

3. The bearing assembly as defined in claim 1, further characterized in that said retainer is of balanced relatively rigid construction with each pocket being generally fully enclosed.

4. The bearing assembly as defined in claim 1, wherein the number of said lower side rail sections and the number of said upper side rail sections in each side rail is equal.

5. The bearing assembly as defined in claim 1, wherein said lower side rail sections are of a greater radial thickness than the radial thickness of said upper side rail sections to provide approximately the same amount of plastic material in said upper and said lower side rail sections.

6. The bearing assembly as defined in claim 1, in which the amount of plastic material in said lower side rail section is controlled to be slightly less than that in said upper side rail section to provide for dynamic rotational balance of said retainer.

7. The bearing assembly as defined in claim 1, in which the cross-sectional shape of each cross bar taken in a plane transverse to the rotational axis of said retainer includes a pair of radially spaced axially extending circumferentially projecting raised members for maintaining the rollers within the retainer and controlling radial displacement of the rollers within the retainer pockets.

8. The bearing assembly as defined in claim 1, further characterized in that the axially extending surface of each said cross bar defining one face of a retainer pocket is formed with an axially extending circumferentially disposed relief portion to provide a recess circumferentially spaced in clearance relationship relative to the surface of a roller to accommodate any flash resulting from the molding of the retainer and to prevent contact or interference thereof with a roller in the retainer pocket.

9. The bearing assembly as defined in claim 1, wherein each said cross bar is provided with an axially extending groove extending radially inwardly of the outer radial edge thereof forming a relief portion to provide sufficient flexibility to facilitate insertion of the rollers into the pockets.

10. The bearing assembly as defined in claim 1, further characterized in that each cross bar is provided with an axially extending groove extending radially inwardly of the surface of the inner radial edge thereof forming a relief portion to provide sufficient flexibility to facilitate insertion of the rollers into the retainer pocket.

* * * * *